(No Model.)

G. B. MINARD.
VEHICLE SPRING.

No. 412,645. Patented Oct. 8, 1889.

Witnesses
L. S. Elliott.
H. L. Beall.

George B. Minard.
Inventor

By his Attorneys

UNITED STATES PATENT OFFICE.

GEORGE B. MINARD, OF MOUNT GILEAD, OHIO, ASSIGNOR OF ONE-HALF TO OSWALD W. FRITZSCH, OF SAME PLACE.

VEHICLE-SPRING.

SPECIFICATION forming part of Letters Patent No. 412,645, dated October 8, 1889.

Application filed August 13, 1889. Serial No. 320,620. (No model.)

*To all whom it may concern:*

Be it known that I, GEORGE B. MINARD, a citizen of the United States of America, residing at Mount Gilead, in the county of Morrow and State of Ohio, have invented certain new and useful Improvements in Vehicle-Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs for vehicles, the object being to provide a spring which can be easily made from a single piece of metal, said spring having a single coil, so as to place both members or ends thereof in the same direction, one end being of reduced diameter, so that the longest terminal portion of the spring will have the greatest elasticity, and at the same time provide a spring which can be easily attached to different styles of vehicles; and my invention consists in a spring which is made up of a single piece of metal, said metal being tapered and curved, the thicker portion of the metal being coiled, so that the upper or thicker member will extend in substantially the same direction as the lower tapered member, as will be hereinafter more fully set forth, and specifically pointed out in the claims.

Figure 1:
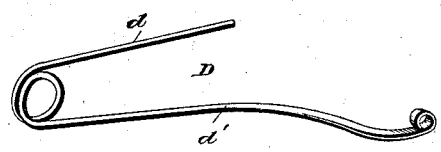
Figure 2:
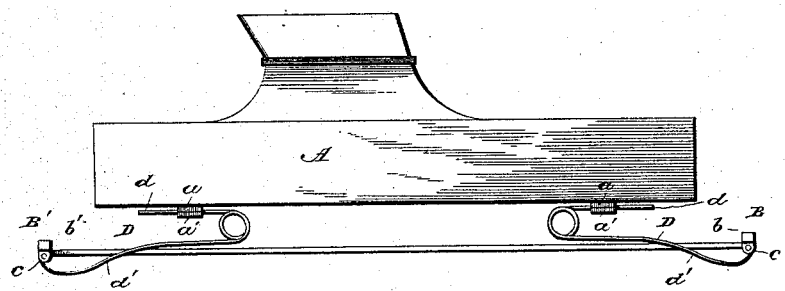

In the accompanying drawings, Figure 1 is a perspective view of a spring constructed in accordance with my invention. Fig. 2 is a side view showing the same applied to a vehicle.

A refers to the spring-supported body of the vehicle, said body being of ordinary construction, and in the present case the bottom board or cross-braces of said body have secured thereto plates $a\ a$, which are provided longitudinally with semicircular recesses. Beneath the plates $a\ a$ are suitably secured the lower plates $a'\ a'$, which are also provided with semicircular recesses. These plates $a$ and $a'$ when secured together form a clip having a longitudinal opening, in which the upper member of the spring is secured. Either the upper or lower plates may be provided with a knife-edged projection which will impinge or bite upon the upper member of the spring and prevent the same slipping longitudinally when the clamping and securing bolts are tightly drawn. The recess formed between the plates $a$ and $a'$ will be of the same configuration as a cross-section of the upper member of the spring, which is preferably round, though in practice it may be otherwise shaped.

B and B' refer to the front and rear cross-bars of the vehicle, and these cross-bars are provided with clips $b\ b'$, which have depending lugs $c\ c$, through which pass clip-bolts for securing the eyes of the springs thereto.

The springs D are made up of a single bar of metal, and one of the terminal portions, from the end to a point beneath the end of the upper portion of the spring, is tapered or flattened. A single coil or twist is then formed in the bar, so that the upper and lower members will both lie in the same direction and be substantially parallel with each other when applied to a vehicle. The upper member $d$ of the spring is of about one-half the length of the lower member $d'$, which tapers for one-half or more of its length, and this lower member commences to curve downwardly at the point where the taper commences, and near its end it is curved slightly upwardly.

With a spring constructed as described there are two main points of movement—to wit, the coil and the reduced half of the lower member—while the upper portion is substantially rigid and provides a means for adjusting and attaching the spring to a vehicle, thus permitting springs of a uniform size to be applied to vehicles of different size. It will be observed that with my improved spring the coil closes or contracts as the load increases, and that no perforations or bolt-holes are provided, which form weak points; also, that but a single coil is employed, which throws both members of the spring in the same direction.

This spring may be used with either side-bar or cross-bar buggies, as well as for road-carts and spring-seats.

By providing a single coil the members of the spring will be located almost one above the other, and when it is desired that they should be on a vertical line with each other the coils of the spring can be slightly inclined, as the bar can be turned in the clips attached to the body, and the clips attached to the cross-bars can be placed on a line with the short upper ends of the spring.

I am aware that prior to my invention it has been proposed to make a vehicle-spring of a single rod or bar of metal and form a coil in the center, the projecting ends of said bar extending in the same direction; also, that springs have been thus bent or shaped, said springs being made of a flat bar, and I do not claim such as my invention. Neither do I claim a spring as shown and described in Letters Patent No. 368,371, dated August 16, 1887; but

What I claim as new is—

1. A vehicle-spring made up of a bar of metal having a single coil, the extending ends of said bar extending in substantially the same direction, the lower member of the spring being of greater length than the upper member and tapered from a point beneath the end of the upper member to its end, said tapered portion being bent downwardly and then upwardly and formed into an eye, the upper and lower members being one above the other, except at the coil, substantially as shown, and for the purpose set forth.

2. The combination, with the body A, of plates $a$ $a'$, having recesses within which the upper member of the spring lies, a spring having a horizontal upper member connected to the lower member by a single coil, said coiled portion being slightly inclined, so as to locate the lower member beneath the upper member, the terminal portion of the lower member which extends beyond the end of the upper member being tapered to its end, said tapered portion being curved first downwardly and then upwardly, an eye formed at the end of said tapered portion, and a clip attached to the running-gear for attaching the end of the spring thereto, substantially as shown, and for the purpose set forth.

In testimony whereof I affix my signature in presence of two witnesses.

GEORGE B. MINARD.

Witnesses:
O. W. FRITZSCH,
FRED MITCHELL.